(12) United States Patent     (10) Patent No.: US 12,649,621 B1
Aleman                             (45) Date of Patent: Jun. 9, 2026

(54) ERGONOMIC AND EFFICIENT TRASH AND RECYCLING RECEPTACLE

(71) Applicant: Armando Perez Aleman, Miami, FL (US)

(72) Inventor: Armando Perez Aleman, Miami, FL (US)

( * ) Notice: Subject to any disclaimer, the term of this patent is extended or adjusted under 35 U.S.C. 154(b) by 0 days.

(21) Appl. No.: 19/339,671

(22) Filed: Sep. 25, 2025

(51) Int. Cl.
| | |
|---|---|
| *B65F 1/16* | (2006.01) |
| *B62B 1/16* | (2006.01) |
| *B65F 1/14* | (2006.01) |
| *B65F 3/00* | (2006.01) |
| *H01F 7/02* | (2006.01) |

(52) U.S. Cl.
CPC .......... B65F 1/1646 (2013.01); B65F 1/1452 (2013.01); B65F 1/1473 (2013.01); B65F 3/005 (2013.01); H01F 7/0252 (2013.01); B62B 1/16 (2013.01); B65F 2001/1653 (2013.01)

(58) Field of Classification Search
CPC .... B65F 1/1646; B65F 1/1452; B65F 1/1473; B65F 3/005; B65F 2001/1653; H01F 7/0252; B62B 1/16
USPC ................................................ 220/832, 908
See application file for complete search history.

(56) References Cited

U.S. PATENT DOCUMENTS

| | | | | |
|---|---|---|---|---|
| 6,182,856 B1 * | 2/2001 | Berrenberg | ............. | B65F 1/122 |
| | | | | 220/908 |
| 7,114,631 B2 * | 10/2006 | Aiken | ........................ | B65F 1/16 |
| | | | | 220/908 |
| 2002/0130128 A1 * | 9/2002 | Berglund | ............. | B65D 43/167 |
| | | | | 220/230 |
| 2014/0020341 A1 * | 1/2014 | Coburn | ................. | G01F 19/002 |
| | | | | 220/832 |
| 2015/0076154 A1 * | 3/2015 | Clark | ..................... | B65D 85/60 |
| | | | | 220/520 |
| 2015/0225137 A1 * | 8/2015 | Wei | ........................ | B65D 19/06 |
| | | | | 220/230 |

* cited by examiner

*Primary Examiner* — James N Smalley
(74) *Attorney, Agent, or Firm* — Calrie Marsh, P.A.; Calrie Marsh, Esq.

(57) ABSTRACT

The present invention provides improved configurations for a waste receptacle for ease of use by residential users and efficient waste collection. The improvements comprise a cuboid bin and hinged lid receptacle having two wheels connected by an axle at the bottom and a handlebar at the top portion, a first magnet on the lid and a second on the bin, and a crossbar. The wheels, axle, and handlebar are located in the same vertical plane, whereas the hinges and the magnets are located in a vertical plane left (or right) adjacent thereof, and the crossbar is located in a vertical plane directly opposite thereof. The magnets securely attach the lid to the bin during waste deposit and collection. The location of the crossbar in relation to the handlebar, combined with the location of the hinges and magnets creates an ergonomic and efficient receptable for maneuvering and trash collection.

10 Claims, 3 Drawing Sheets

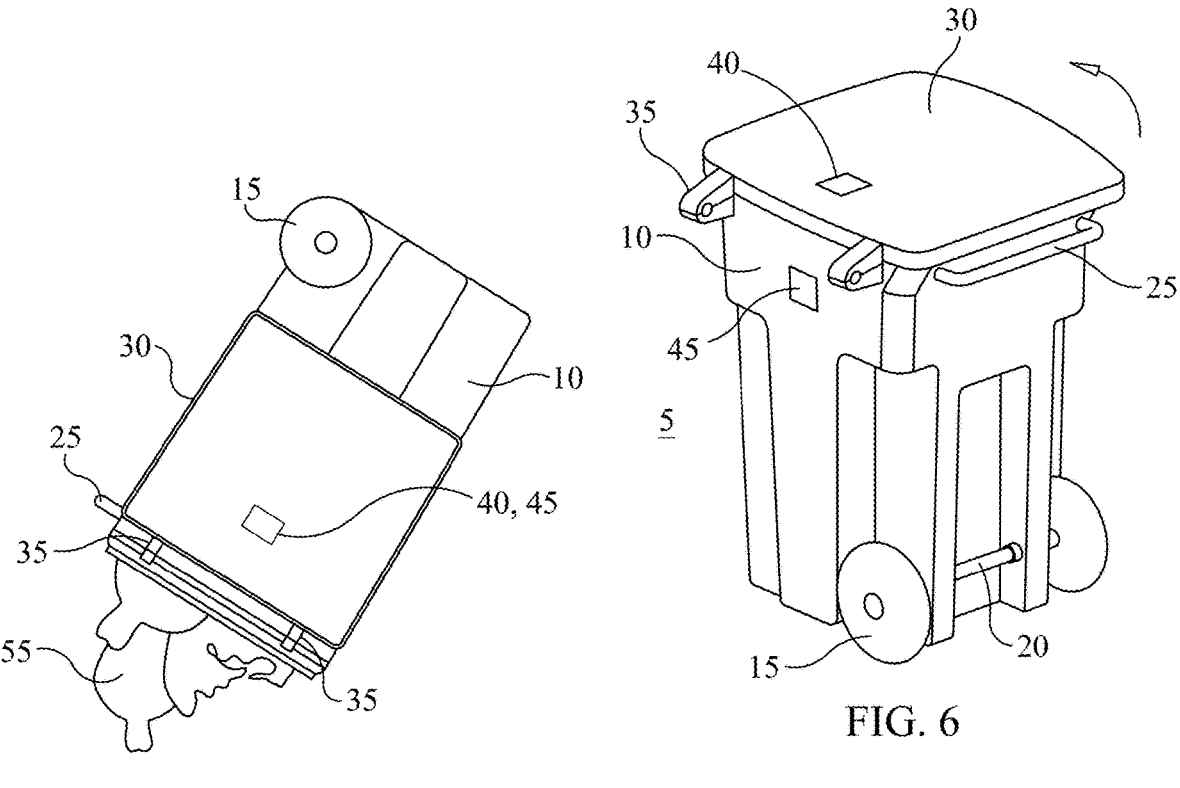
FIG. 5
FIG. 6
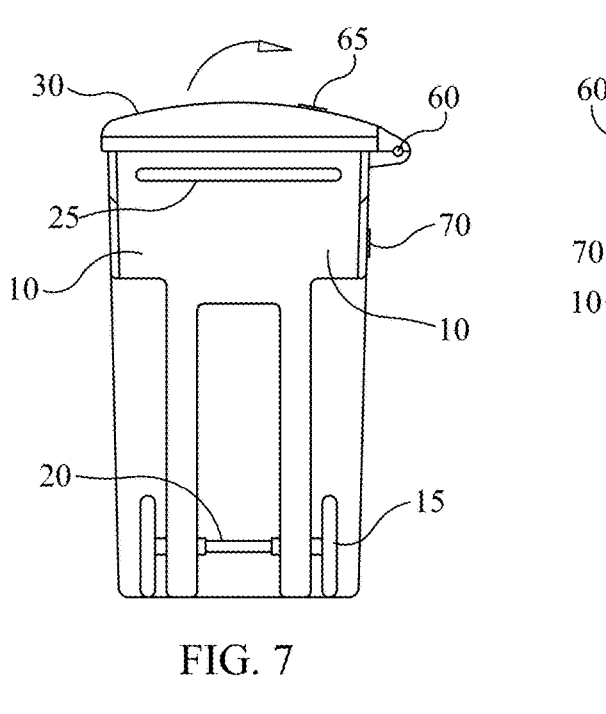
FIG. 7
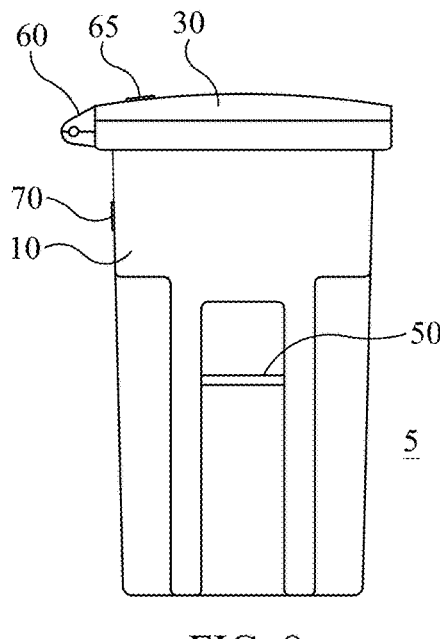
FIG. 8

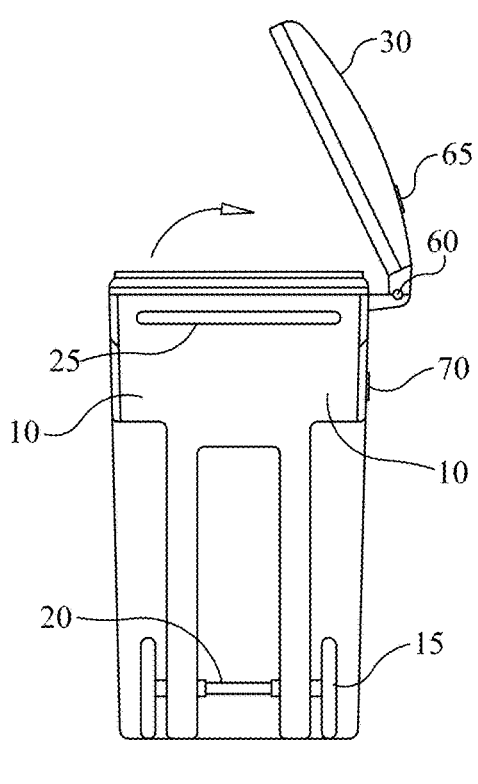
FIG. 9
FIG. 10
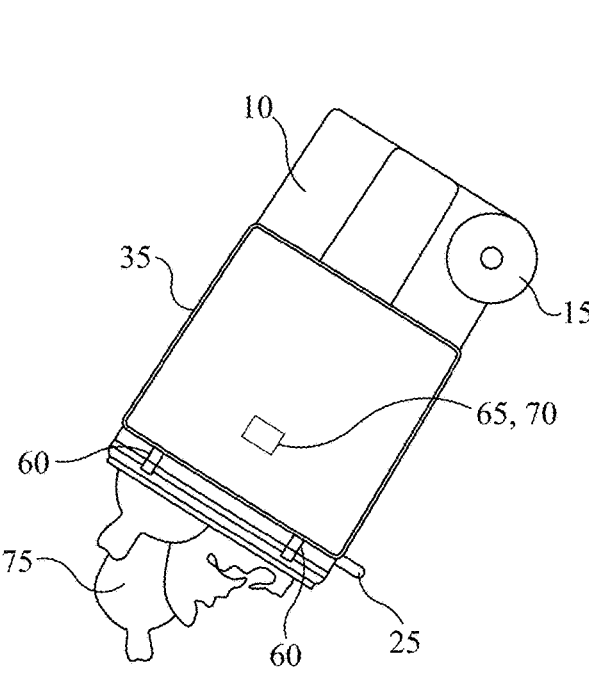
FIG. 11
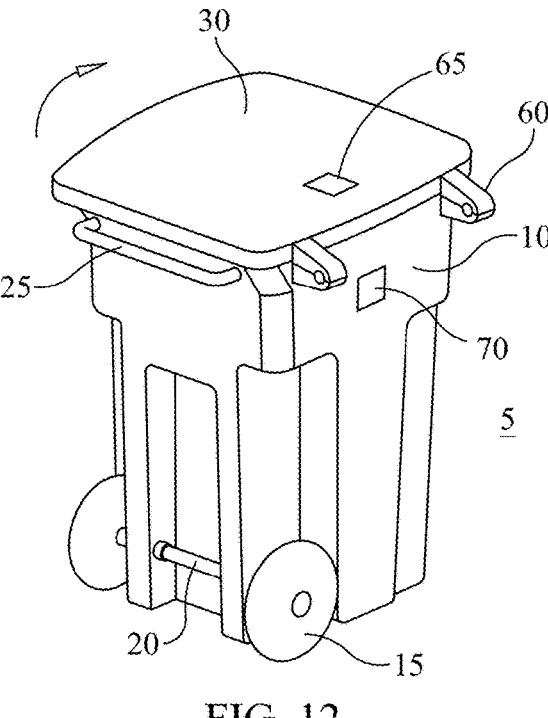
FIG. 12

ERGONOMIC AND EFFICIENT TRASH AND RECYCLING RECEPTACLE

STATEMENT REGARDING FEDERALLY SPONSORED RESEARCH OR DEVELOPMENT

This invention has been created without the sponsorship or funding of any federally sponsored research or development program.

FIELD OF INVENTION

The present invention relates generally to garbage and recycling receptacles and specifically to modified garbage and recycling receptacles for purposes of increasing ergonomic maneuvering and efficient waste collection.

BACKGROUND

Garbage and/or recycling bins for residential use are designed with the wheels, handlebar, and the hinge of the lid/cover are all located at in the same plane or side of the receptacle (front or back), and a crossbar located in a different plane or side from the wheels, handlebar, and the hinge. With this existing design, a user must move the receptacle to and from the curb, pushing or pulling it from behind. This design makes it difficult, cumbersome, and awkward for residential users to maneuver the bin during use. The existing bin makes it even more difficult, cumbersome, and awkward for a residential user to move the bin about when it is full or heavy and/or when depositing trash or recycling items into the bin, whether the bin is moving or stationary. The residential user has to walk around to the front of the bin in order to raise or remove the lid and access the bin for depositing trash or recycling items, and then turn the bin to move it to the collection point. This poses a problem not only for the average residential user, but also more significantly for the elderly, the frail, or the otherwise physically challenged residential user.

Additionally, Perez Aleman U.S. Pat. Nos. 12,060,222 and 12,145,796 address rearranging the hinges to improve the ergonomics and maneuverability for the elderly, the frail, or the otherwise physically challenged residential user, however the improvements described require more physical input from waste collection personnel operating a rear loading or front loading waste collection vehicle. Notably, these patents require the waste collecting personnel to pull the waste collection receptacle close enough to the waste collection vehicle, open the lid of the waste collection receptacle and then rotate the receptacle or tilt it to position the crossbar, which is located in the same vertical plane as the handle, wheel, and axle, in order for the crossbar to be connected to the arm or mechanism used to lift the receptacle and empty its contents into the back bay of the waste collection vehicle. This requires several steps to complete the process, expending much time and energy. Thus, there is reduced efficiency of the waste collection process by waste management services.

SUMMARY OF INVENTION

The present invention addresses both the ergonomic issues and waste collection issues posed by the existing design and configuration of residential garbage and/or recycling bins. The present invention positions the wheels, axle and handlebar of a receptacle in the same vertical plane, the hinges in a vertical plane adjacent to the wheels, axle, and the crossbar in a vertical plane opposite to that of the wheels, axle and handlebar, in combination with a first magnet on the lid and a second magnet on the bin located in the same plane has the hinges. This configuration facilitates or allows for the opening of the lid while a user, which could be a residential user or waste collection personnel, is positioned near or at the handlebar of the receptacle. This configuration does not hinder the depositing of trash or other items into the receptacle while the user is positioned near or at the handlebar of the receptacle nor does it interfere with the normal process for the collection of trash by a waste collection vehicle.

The position of the hinges allows for the unobstructed opening of the lid by a user. A residential user is able to effortlessly maneuver the receptacle from one location to another location, such as from the storage area to the curbside or vice versa. The location of the hinges in relation to the handlebar allows a user to ergonomically maneuver the bin, regardless of whether the use is a residential user or waste collection personnel. The location of the crossbar in relation to the handlebar combined with the location of the hinges and magnets makes the receptacle suitable for use with various types of waste collection vehicles, including but not limited to rear loading waste collection vehicles, as it improves the efficiency of the waste collection process and the physical output of the waste collector. By way of example, the rear loading waste collection vehicle is able to connect to the crossbar for the mechanical disposal of trash which limits or eliminates the moving and tilting effort needed from waste collection personnel. This invention increases the speed and efficiency of trash collection with waste collection vehicles such as a rear loading type, and decreases the waste collector's interaction with the receptacle.

While Perez Aleman U.S. Pat. Nos. 12,060,222 and 12,145,796 addressed accessibility issues for the everyday residential user, this improvement builds on that foundation by extending a benefit to waste collection personnel. This improvement enables waste collection personnel to mechanically engage and empty the receptacle without repeated tilting. Both the residential user and waste collection personnel benefit from this improved design.

BRIEF DESCRIPTION OF THE DRAWINGS

FIG. 5 is a side perspective view of the present invention illustrating wheels and handlebar in the same vertical plane, and lid hinge(s) located in a vertical plane that is left adjacent thereof, with the lid fully opened and secured by magnets, and the bin tilted upside down to allow the release of waste;

FIG. 6 is a side perspective view of the present invention illustrating wheels and handlebar in the same vertical plane, and lid hinge(s) located in a vertical plane that is left adjacent thereof;

FIG. 7 is a front perspective view of the present invention illustrating wheels and handlebar in the same vertical plane, and lid hinge(s) located in a vertical plane that is right adjacent thereof;

FIG. 8 is a rear perspective view of the present invention illustrating a crossbar located in a vertical plane opposite to the vertical plane of the wheels and handlebar, and lid hinge(s) located in a vertical plane that is left adjacent to the crossbar;

FIG. 9 is a front perspective view of the present invention illustrating wheels and handlebar in the same vertical plane, and lid hinge(s) located in a vertical plane that is right adjacent thereof, with the lid partially opened;

FIG. 10 is a front perspective view of the present invention illustrating wheels and handlebar in the same vertical plane, and lid hinge(s) located in a vertical plane that is right adjacent thereof, with the lid fully opened and secured by magnets;

FIG. 11 is a side perspective view of the present invention illustrating wheels and handlebar in the same vertical plane, and lid hinge(s) located in a vertical plane that is right adjacent thereof, with the lid fully opened and secured by magnets, and the bin tilted upside down to allow the release of waste; and FIG. 12 is a side perspective view of the present invention illustrating wheels and handlebar in the same vertical plane, and lid hinge(s) located in a vertical plane that is right adjacent thereof.

DESCRIPTION OF THE INVENTION

Before the subject invention is described further, it is to be understood that the invention is not limited to the embodiments of the invention described below, as variations of the particular embodiments may be made and still fall within the scope of the invention. It is also to be understood that the terminology employed is for the purpose of describing particular embodiments and is not intended to be limiting.

The details of one or more embodiments of the invention are set forth in the accompanying drawings and the description below. Other features, objects, and advantages of the invention will be apparent from the description and drawings, and from the claims. In the following description, numerous specific details are set forth to provide a thorough understanding of the embodiments. One skilled in the art to which this invention belongs will recognize, however, that the techniques described can be practiced without one or more of the specific details, or with other methods, components, materials, etc. In other instances, well known structures, materials, or operations are not shown or described in detail to avoid obscuring certain aspects.

In this specification, the singular forms "a," "an" and "the" include plural reference unless the context clearly dictates otherwise. Unless defined otherwise, all technical and scientific terms used herein have the same meaning as commonly understood to one of ordinary skill in the art to which this invention belongs.

The present invention, in its various embodiments, is adaptable for use with a variety of waste collection vehicles. Waste collection vehicles come in many designs. The waste collection industry is for the most part standardized around three main collection methods: Rear loaders (manual collection by workers), automated side loaders (robotic arm collection) and automated front loaders (front-mounted arm collection, with a very similar system of grabbing the receptacle as the side loaders). For automated side and front loaders, the robotic or mechanical arm grabs or takes hold of the receptable, then lifts the receptacle into a bay or waste collection compartment of the waste compartment vehicle where trash is deposited and the receptacle is returned to its original location (near or on a curb). For rear loader waste collection vehicles, the waste collection personnel is responsible for positioning the crossbar close to the mechanical arm of rear loader waste collection vehicle to ensure a secure connection with the mechanical arm. Automated rear loader waste collection vehicles utilize a hydraulic lifting mechanism or robotic arm to grab the crossbar in order to empty the contents of the receptacle into a hopper at the rear of the vehicle.

Figure 1:
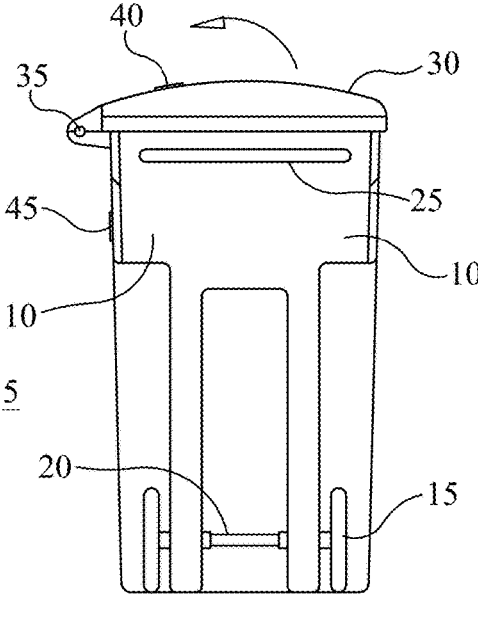
FIG. 1 is a front perspective view of the present invention illustrating wheels and handlebar in the same vertical plane, and lid hinge(s) located in a vertical plane that is left adjacent thereof.
Figure 2:
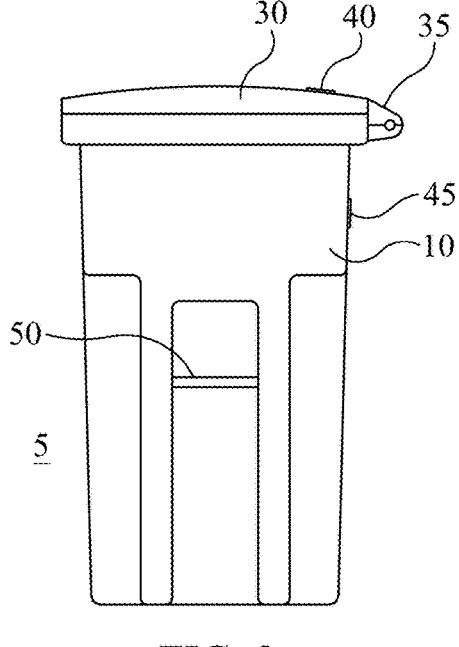
FIG. 2 is a rear perspective view of the present invention illustrating a crossbar located in a vertical plane opposite to the vertical plane of the wheels and handlebar, and lid hinge(s) located in a vertical plane that is right adjacent to the crossbar.
Figure 3:
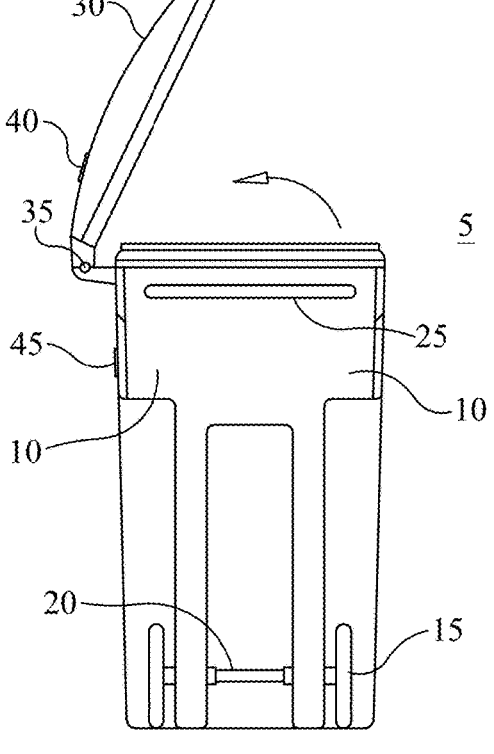
FIG. 3 is a front perspective view of the present invention illustrating wheels and handlebar in the same vertical plane, and lid hinge(s) located in a vertical plane that is left adjacent thereof, with the lid partially opened.

The present invention is an improvement on a residential garbage and/or recycling receptacle 5, as depicted in FIGS. 1 and 2, comprising a hollow cuboid bin 10 portion, generally having non-segmented upper, middle, and bottom areas (not referenced in drawings); the cuboid bin having four vertical side walls, also referred to as vertical planes; two wheels 15 connected by an axle 20 located at the bottom area of the bin; a handlebar 25 located at the top area of the bin 10; a lid 30 located on the top of the bin 10, and lid hinges 35 that attach the lid 30 to the bin 10 of the receptacle 5; a first magnet 40 located on the lid 30; and a second magnet 45 located in the middle to top area of the bin 10 in the same vertical plane or on the same vertical side wall as the hinge(s) 35; and a crossbar 50 located about the middle of the bin 10 in a vertical plane or on a vertical side wall opposite from that of the handlebar 25, the wheels 15, and axle 20 (as depicted in FIG. 2). As shown in FIG. 2, the crossbar 50 is located in a vertical plane or on a vertical side wall that is perpendicular and right adjacent to the hinges 35 and the magnets 40 and 45.

Figure 4:
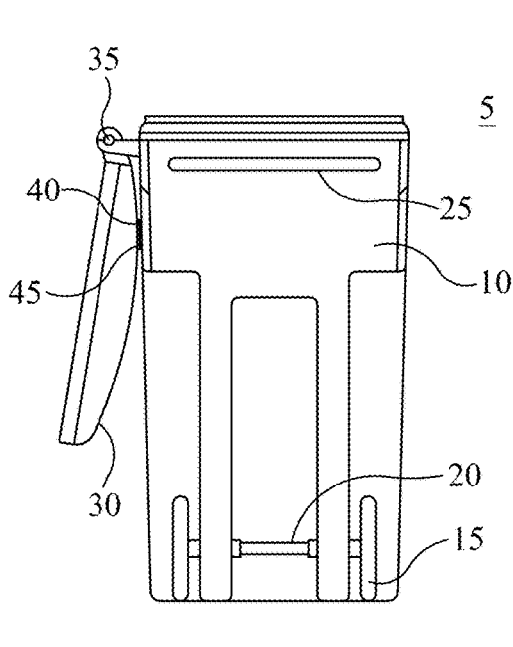
FIG. 4 is a front perspective view of the present invention illustrating wheels and handlebar in the same vertical plane, and lid hinge(s) located in a vertical plane that is left adjacent thereof, with the lid fully opened and secured by magnets.

As shown in FIGS. 1, 3, 4, 5 and 6, the handlebar 25, the two wheels 15, and the axle 20, are all located in the same vertical plane or on the same vertical side wall of the bin 10 which is cuboid in shape, having at least four vertical planes or sides or faces. In FIGS. 1, 3, 4, 5 and 6, the hinges 35 are located in a vertical plane or on a vertical side wall that is perpendicular and left adjacent to that of the handlebar 25, the two wheels 15, and the axle 20. The magnets 40 and 45 are in the same vertical plane as the hinges 25 and are positioned a distance above (on the lid 30) or below (on the bin 10) the hinges 35 in such a way that when the lid 30 is opened, the magnets 40 and 45 connect to each other, securely attaching the lid 30 to the face of the bin 10 during waste disposal as depicted in FIGS. 4 and 5.

The configuration described above facilitates or allows for the opening of the lid 30 while a user, defined as a residential user or waste collection personnel, is positioned near or at the handlebar 25 of the receptacle 5. This configuration does not hinder the depositing of trash 55 or other items into the receptacle 5 while the user is positioned near or at the handlebar 25 of the receptacle 5 nor does it interfere with the normal process for the collection of trash 55 by a waste collection vehicle. The position of the hinges 35 allows for the unobstructed opening of the lid 30 by a user. The user is able to effortlessly maneuver the receptacle 5 from one location to another location, such as from the storage area to the curbside or vice versa or close to a waste collection vehicle. The location of the hinges 35 in relation to the handlebar 25 facilitates the efficient and ergonomic maneuvering of the bin by any user.

The location of the crossbar 50 in relation to the handlebar 25 combined with the location of the hinge(s) 35 and magnets 40 and 45, makes the receptacle 5 more suitable for use with a rear loading or side loading waste collection vehicle as it improves the efficiency of the waste collection process and the physical output of the waste collection personnel (also referred to herein as a waste collector). By way of example, the mechanism of a rear loading waste collection vehicle is able to connect to the crossbar 50 for the mechanical disposal of trash 55 which limits or eliminates the maneuvering or tilting effort needed from waste collection personnel. This invention increases the speed and efficiency of trash collection with a rear loading or side loading waste collection vehicle and decreases the waste collector's interaction with the receptacle 5. This invention as described provides an ergonomic and efficient way for both a residential user or waste collection personnel to handle and maneuver a waste collection receptacle 5.

As depicted in FIGS. 7 through 12, in a second embodiment of the present invention, the receptacle 5 has hinges 60 which are located in a vertical plane or a vertical side wall that is perpendicular and right adjacent to that of the handlebar 25, the two wheels 15, and the axle 20. This embodiment includes a first magnet 65 that is located on top of the lid 30 and a second magnet 70 that is located in the middle to top area of the bin 10 as depicted in FIGS. 7, 9, and 12. The magnets 65 and 70 are in the same vertical plane as the hinges 60 and are positioned a distance above (on the lid 30) or below (on the bin 10) the hinges 60 in such a way that when the lid 30 is opened, the magnets 65 and 70 connect to each other, securely attaching the lid 30 to the face of the bin 10 during waste disposal as depicted in FIGS. 9, 10, 11, and 12. In practice, a waste collector opens the lid 30 to empty the bin 10 whereas a residential user closes the lid 30 and returns the bin 10 to its storage location. However, any user is able to open the lid 30 whereby it is attached to the bin 30 by a fastening means, and then close the lid 30 by manually disconnecting the fastening means.

As shown in FIG. 8, the crossbar 50 is located in a vertical plane or on the vertical side wall of the bin 10 that is perpendicular and left adjacent to the hinges 60 and the magnets 65 and 70. This configuration facilitates or allows for the opening of the lid 30 while a user is positioned near or at the handlebar 25 of the receptacle 5 This configuration does not hinder the depositing of trash 75 or other items into the receptacle 5 while the user is positioned near or at the handlebar 25 of the receptacle 5 nor does it interfere with the normal process for the collection of trash 75 by a waste collection vehicle. The position of the hinges 60 allows for the unobstructed opening of the lid 30 by a residential user. A user, whether a residential user or waste collector, is able to effortlessly maneuver the receptacle 5 from one location to another location, such as from the storage area to the curbside or vice versa or close to the waste collection vehicle. The location of the hinges 60 in relation to the handlebar 25, as described in the second embodiment, allows any user to maneuver the bin. The location of the crossbar 50 in relation to the handlebar 25 combined with the location of the hinge(s) 60 and magnets 65 and 70, as described in the second embodiment of the invention, makes the receptacle 5 suitable for use with a variety of waste collection vehicles, including but not limited to a rear loading or side loading waste collection vehicle, as it improves the efficiency of the waste collection process and the physical output of the waste collector. By way of example, a rear loading waste collection vehicle is able to connect to the crossbar 50 for the mechanical disposal of trash 75 which limits or eliminates the tilting effort needed from waste collection personnel. This invention increases the speed and efficiency of trash collection with a waste collection vehicle and decreases the waste collector's manipulation of the receptacle 5 in the process.

The embodiments of this invention described herein may be adapted for use with other compatible waste collection vehicles such as a rear loading or sided loading or front loading waste collection vehicle. The location of the hinges of the receptacle in relation to the crossbar is designed to accommodate the ergonomic needs of both a residential user and a waste collector.

In the various embodiments of this invention, the magnets may be substituted for any suitable fastening means known to one of ordinary skill in the art of fastening means. In various of embodiments of this invention, the fastening means may be made of any suitable material such as magnetized metal, Velcro, Neodymium, mechanical clips or other materials known to one of ordinary skill in the art of fastening means.

As various changes may be made in the above-described subject matter without departing from the scope and the spirit of the invention, it is intended that all subject matter contained in the above description, or shown in the accompanying drawings, will be interpreted as descriptive and illustrative, and not in a limiting sense.

EQUIVALENTS

Those skilled in the art will recognize or be able to ascertain using no more than routine experimentation, many equivalents to the specific embodiments of the invention described herein. Such equivalents are intended to be encompassed by the claims.

What is claimed is:

1. An ergonomic and efficient garbage and recycling receptacle, comprising:

a hollow cuboid bin for depositing garbage or recycling material, having four vertical side walls, and each vertical side wall having an upper area, a middle area, and a bottom area;

a handlebar located at the upper area of the bin of one vertical side wall;

two wheels located at the bottom area of the bin, positioned adjacent to each other and are attached to each other by an axle; and the wheels being on the same vertical side wall as the handlebar;

a crossbar positioned at the middle area of the bin, and located on a vertical side wall that is opposite from the two wheels and axle; and a lid attached to the bin by hinges that are located on the upper area of the bin and on the vertical side wall that is perpendicular to the vertical side wall that contains the handlebar and perpendicular to the vertical side wall containing the crossbar, allowing the lid to open away from the perpendicular vertical side walls of the bin that contain the handlebar and the crossbar; and a first magnet positioned on the lid and a second magnet positioned on the vertical side wall of the bin where the hinges are located, whereby when the bin is manually opened by a user, the top of the lid is securely connected to the bin by the magnetic attraction between the first magnet and the second magnet and the bin remains completely opened until the first magnet and the second magnet are manually detached by a user; and

when the crossbar is engaged by a mechanical arm of a waste collection vehicle for the disposal of waste, the lid remains securely connected to the bin by the magnetic attraction between the first magnet and the second magnet until manually detached by a user closing the bin.

2. The ergonomic and efficient garbage and recycling receptacle of claim 1 wherein the hinges are located in the upper area of the bin and on the vertical side wall that is perpendicular to the left of the vertical wall that contains the handlebar and perpendicular to the right of the vertical side wall containing the crossbar, allowing the lid to open away from the perpendicular vertical side walls of the bin that contain the handlebar and the crossbar.

3. The ergonomic and efficient garbage and recycling receptacle of claim 1 wherein the hinges are located in the upper area of the bin and on the vertical side wall that is perpendicular to the right of the vertical wall that contains the handlebar and perpendicular to the left of the vertical side wall containing the crossbar, allowing the lid to open away from the perpendicular vertical side walls of the bin that contain the handlebar and the crossbar.

4. The ergonomic and efficient garbage and recycling receptacle of claim 1 wherein the the first magnet and the second magnet consist of magnetized Neodymium.

5. An ergonomic and efficient garbage and recycling receptacle, comprising:

a hollow cuboid bin for depositing garbage or recycling material, having four vertical side walls, and each vertical side wall having an upper area, a middle area, and a bottom area;

a handlebar located at the upper area of the bin of one vertical side wall;

two wheels located at the bottom area of the bin, positioned adjacent to each other and are attached to each other by an axle; and the wheels being on the same vertical side wall as the handlebar;

a crossbar positioned at the middle area of the bin, and located on a vertical side wall that is opposite from the two wheels and axle; and a lid attached to the bin by hinges that are located on the upper area of the bin and on the vertical side wall that is perpendicular to the vertical wall that contains the handlebar and perpendicular to the vertical side wall containing the crossbar, allowing the lid to open away from the perpendicular vertical side walls of the bin that contain the handlebar and the crossbar; and a first hook and loop fastener, positioned on the lid and a second hook and loop fastener positioned on the vertical side wall of the bin where the hinges are located, whereby when the bin is manually opened by a user, the top of the lid is securely connected to the bin by the hook and loop fasteners that grip together and the bin remains completely opened until the first hook and loop fastener and the second hook and loop fastener are manually detached by a user; and when the crossbar is engaged by a mechanical arm of a waste collection vehicle for the disposal of waste, the lid remains securely connected to the bin by the hook and loop fasteners that grip together until manually detached by a user closing the bin.

6. The ergonomic and efficient garbage and recycling receptacle of claim 5 wherein the hinges are located in the upper area of the bin and on the vertical side wall that is perpendicular to the left of the vertical wall that contains the handlebar and perpendicular to the right of the vertical side wall containing the crossbar, allowing the lid to open away from the perpendicular vertical side walls of the bin that contain the handlebar and the crossbar.

7. The ergonomic and efficient garbage and recycling receptacle of claim 5 wherein the hinges are located in the upper area of the bin and on the vertical side wall that is perpendicular to the right of the vertical wall that contains the handlebar and perpendicular to the left of the vertical side wall containing the crossbar, allowing the lid to open away from the perpendicular vertical side walls of the bin that contain the handlebar and the crossbar.

8. An ergonomic and efficient garbage and recycling receptacle, comprising:

a hollow cuboid bin for depositing garbage or recycling material, having four vertical side walls, and each vertical side wall having an upper area, a middle area, and a bottom area;

a handlebar located at the upper area of the bin of one vertical side wall;

two wheels located at the bottom area of the bin, positioned adjacent to each other and are attached to each other by an axle; and the wheels being on the same vertical side wall as the handlebar;

a crossbar positioned at the middle area of the bin, and located on a vertical side wall that is opposite from the two wheels and axle; and a lid attached to the bin by hinges that are located on the upper area of the bin and on the vertical side wall that is perpendicular to the vertical wall that contains the handlebar and perpendicular to the vertical side wall containing the crossbar, allowing the lid to open away from the perpendicular vertical side walls of the bin that contain the handlebar and the crossbar; and a first mechanical clip positioned on the lid and a second mechanical clip positioned on the vertical side wall of the bin where the hinges are located, whereby when the bin is manually opened by a user, the top of the lid is securely connected to the bin by the mechanical clips interlocking with each other and the bin remains completely opened until the first mechanical clip and the second mechanical clip are manually detached by a user; and when the crossbar is engaged by a mechanical arm of a waste collection vehicle for the disposal of waste, the lid remains securely connected to the bin by the mechanical clips interlocking with each other until manually detached by a user closing the bin.

9. The ergonomic and efficient garbage and recycling receptacle of claim 8 wherein the hinges are located in the upper area of the bin and on the vertical side wall that is perpendicular to the left of the vertical wall that contains the handlebar and perpendicular to the right of the vertical side wall containing the crossbar, allowing the lid to open away from the perpendicular vertical side walls of the bin that contain the handlebar and the crossbar.

10. The ergonomic and efficient garbage and recycling receptacle of claim 8 wherein the hinges are located in the upper area of the bin and on the vertical side wall that is perpendicular to the right of the vertical wall that contains the handlebar and perpendicular to the left of the vertical side wall containing the crossbar, allowing the lid to open away from the perpendicular vertical side walls of the bin that contain the handlebar and the crossbar.

* * * * *